United States Patent
Mote et al.

(10) Patent No.: US 7,108,152 B2
(45) Date of Patent: Sep. 19, 2006

(54) FRYER VATS HAVING STRENGTHENED VAT WELDS AND METHODS OF MANUFACTURING SUCH FRYER VATS

(75) Inventors: Ned M. Mote, Laura, OH (US); Steve D. Werts, Eaton, OH (US); Ellis Joel Guthrie, Eaton, OH (US); James F. Anglin, Hamilton, OH (US); David C. Boyer, Springfield, OH (US)

(73) Assignee: Henny Penny Corporation, Eaton, OH (US)

( * ) Notice: Subject to any disclaimer, the term of this patent is extended or adjusted under 35 U.S.C. 154(b) by 583 days.

(21) Appl. No.: 10/316,182

(22) Filed: Dec. 11, 2002

(65) Prior Publication Data

US 2003/0150335 A1    Aug. 14, 2003

Related U.S. Application Data

(60) Provisional application No. 60/354,476, filed on Feb. 8, 2002.

(51) Int. Cl.
*B65D 6/28* (2006.01)
*B65D 6/32* (2006.01)

(52) U.S. Cl. .................... 220/678; 219/137 R
(58) Field of Classification Search ............ 220/678; 99/330, 403; 126/390.1; 219/137 R; 228/225, 228/245, 256
See application file for complete search history.

(56) References Cited

U.S. PATENT DOCUMENTS

| 1,688,360 A | 10/1928 | Steigerwald |
| 1,934,064 A | 11/1933 | Hermanson et al. |
| 2,025,922 A | 12/1935 | Weinrich |
| 2,141,021 A | 12/1938 | Rooke et al. |
| 2,269,224 A | 1/1942 | Reilly |
| 2,756,311 A | 7/1956 | Persson et al. |
| 2,935,312 A | 5/1960 | Kilpatrick et al. |
| 3,437,787 A | 4/1969 | Chyle |
| 3,549,857 A | 12/1970 | Needham et al. |
| 3,621,176 A | 11/1971 | Valente |
| 4,019,018 A | 4/1977 | Oishi et al. |
| 4,167,233 A | 9/1979 | Hare |
| 4,308,446 A | 12/1981 | Okane et al. |
| 5,237,154 A | 8/1993 | Pellhammer et al. |
| 5,308,409 A | 5/1994 | Kamimura et al. |
| 5,321,224 A | 6/1994 | Kamimura et al. |
| 5,347,098 A | 9/1994 | Murakami et al. |

(Continued)

FOREIGN PATENT DOCUMENTS

JP      55073479 A   *   6/1980

*Primary Examiner*—Nathan J. Newhouse
*Assistant Examiner*—Harry Grosso
(74) *Attorney, Agent, or Firm*—Baker Botts L.L.P.

(57) ABSTRACT

A method of manufacturing a fryer vat includes the step of welding together side portions and a main portion of a fryer vat, in which the step of welding includes the step of forming a plurality of vertical vat welds. Further, the step of forming includes the steps of applying a torch over a filler material for a period of time sufficient to melt the filler material, and deactivating the torch in order to allow the melted filler material to cool to a temperature sufficient to form a solid material. The method also includes the step of reapplying the torch over the vertical vat welds for a period of time sufficient to remelt only a portion of the vertical vat welds.

6 Claims, 2 Drawing Sheets

U.S. PATENT DOCUMENTS

| | | |
|---|---|---|
| 5,402,713 A | 4/1995 | King |
| 5,879,480 A | 3/1999 | Hetzner |
| 6,013,890 A | 1/2000 | Hulsizer |
| 6,049,060 A * | 4/2000 | Smashey et al. ........ 219/137 R |
| 6,191,379 B1 | 2/2001 | Offer et al. |
| 6,196,119 B1 | 3/2001 | Takahashi |

* cited by examiner

FRYER VATS HAVING STRENGTHENED VAT WELDS AND METHODS OF MANUFACTURING SUCH FRYER VATS

The present application claims priority from U.S. Provisional Patent Application No. 60/354,476, filed on Feb. 8, 2002, and entitled "Fryer Vats Having Strengthened Vat Welds and Methods of Manufacturing the Same," the disclosure of which is incorporated herein by reference in its entirety.

BACKGROUND OF THE INVENTION

1. Field of the Invention

The invention relates generally to fryer vats and methods of manufacturing such fryer vats. More specifically, the invention is directed towards fryer vats having strengthened vat welds and methods of manufacturing such fryer vats.

2. Description of Related Art

Referring to FIG. 1, a known fryer vat 1 may comprise a main portion 4 and side portions 2 mounted on main portion 4. Side portions 2 may be substantially rectangular in shape. Main portion 4 may comprise a U-shaped portion 4a connected to side portions 2 and a cold zone 4b extending below and from U-shaped portion 4a. Cold zone 4b may comprise a drain formed at the bottom of cold zone 4b for catching any debris, e.g., crumbs, which may fall off of a food product during cooking. During a known manufacturing process, side portions 2 may be fixed to main portion 4 by a known welding process using a known torch (not shown). Specifically, a filler material, e.g., a known solder, such as a stainless steel-based solder, or the like, may be positioned adjacent to or in contact with those portions of side portions 2 contacting main portion 4. The filler material subsequently may be melted using the torch, such that when the filler material cools to a temperature sufficient to form a solid material, the filler material welds side portions 2 to main portion 4.

Referring to FIG. 2, when side portions 2 are welded to main portion 4, a vertical vat weld 6 may be formed at or adjacent to those lines at which U-shaped portion 4a intersects any two vertical ends or edges of side portions 2. For example, a first vertical vat weld 6 may be formed at or adjacent to a line at which U-shaped portion 4a intersects the front, left side portion 2. Similarly, a second vertical vat weld 6 may be formed at or adjacent to a line at which U-shaped portion 4a intersects the front, right side portion 2. Moreover, a third vertical vat weld 6 may be formed at or adjacent to a line at which U-shaped portion 4a intersects the rear, left side portions 2. Similarly, a fourth vertical vat weld 6 may be formed at or adjacent to a line at which U-shaped portion 4a intersects the rear, right side portion 2. When side portions 2 are welded to main portion 4, a horizontal vat weld (not shown) also may be formed at or adjacent to those lines at which U-shaped portion 4a contacts lower ends or edges of side portion 2.

In operation, fryer vat 1 may be positioned inside a known fryer apparatus, e.g., a pressure fryer apparatus, an open fryer apparatus, or the like. A cooking medium, e.g., melted shortening, cooking oil, or the like, may be placed inside fryer vat 1 and heated to a predetermined temperature via at least one heat exchanger tube (not shown) or at least one burner (not shown). When the cooking medium reaches the predetermined temperature, a basket or a tray carrier holding a food product, e.g., chicken, fish, french fries, or the like, may be submersed in the cooking medium, such that the food product may be cooked. Once the food product is cooked, the food product may be removed and the heat exchanger or the burner may be deactivated, such that temperature of the cooking medium may decrease.

Nevertheless, when the cooking medium is heated to the predetermined temperature, the temperature of those portions of fryer vat 1 in contact with the cooking medium, e.g., side portions 2 and U-shaped portion 4a, also may increase. When the temperature of side portions 2 and U-shaped portion 4a increases, side portions 2 and U-shaped portion 4a may thermally expand. Moreover, when the heat exchanger tube or the burner is deactivated and the temperature of the cooking medium decreases, the temperature of side portions 2 and U-shaped portion 4a also may decrease. When the temperature of side portions 2 and U-shaped portion 4a decreases, side portions 2 and U-shaped portion 4a may thermally contract. Consequently, when fryer vat 1 is used over time, the side portions 2 and U-shaped portion 4a may experience thermal stress, e.g., at notches formed at the ends of vertical vat welds 6, due to such thermal expansion and thermal contraction. In particular, vertical vat welds 6 or the horizontal vat welds, or both, may experience sufficient fatigue to cause them to crack, e.g., at the notches, such that fryer vat 1 no longer may be used to cook food products. Moreover, when a user of fryer vat 1 improperly fails to place the cooking medium inside fryer vat 1 prior to activating the heat exchanger or the burner, vertical vat welds 6 or the horizontal vat welds, or both, may more readily crack than when fryer vat 1 is properly filled with cooking medium before heat is applied.

SUMMARY OF THE INVENTION

Therefore, a need has arisen for fryer vats that overcome these and other shortcomings of the related art. A technical advantage of the present invention is that subsequent to a formation of a plurality of vertical vat welds using a torch, the torch may be reapplied to a portion, e.g., the toes, of the vertical vat welds for a period time sufficient to melt only that portion of the vertical vat welds. When the surface layer of the vertical vat welds cools to a temperature sufficient to form a solid surface layer, the vertical vat welds may be strong enough to substantially reduce or to prevent a cracking of the vertical vat welds. Another technical advantage of the present invention is that subsequent to a formation of a plurality of horizontal vat welds using a torch, the torch may be reapplied to the horizontal vat welds for a period time sufficient to melt only that portion of the horizontal vat welds. When the surface layer of the horizontal vat welds cools to a temperature sufficient to form a solid surface layer, the horizontal vat welds may be strong enough to substantially reduce or to prevent a cracking of the horizontal vat welds.

According to an embodiment of the present invention, a method of manufacturing a fryer vat is described. The method comprises the step of welding together a side portions and a main portion of a fryer vat, in which the step of welding comprises the step of forming a plurality of vertical vat welds. Further, the step of forming comprises the steps of applying a torch over a filler material for a period of time sufficient to melt the filler material, and deactivating the torch in order to allow the melted filler material to cool to a temperature sufficient to form a solid material. The method also comprises the step of reapplying the torch over at least a portion, e.g., the toes, of at least one of the vertical vat welds for a period of time sufficient to remelt only a surface layer of the at least one vertical vat weld.

According to another embodiment of the present invention, a fryer vat having strengthened vertical vat welds is described. The fryer vat comprises a plurality of side portions and a main portion welded to the side portions. The fryer also comprises a plurality of vertical vat welds formed at or adjacent to any two vertical ends or edges of the side portions by applying a torch to a filler material. Moreover, at least one of the vertical vat welds comprises a remelted surface layer formed by reapplying the torch over a portion of at least one vat weld subsequent to the formation of the at least one vertical vat weld.

Other objects, features, and advantages of the present invention will be apparent to persons of ordinary skill in the art in view of the following detailed description of the invention and the accompanying drawings.

BRIEF DESCRIPTION OF THE DRAWINGS

For a more complete understanding of the present invention, the needs satisfied thereby, and the objects, features, and advantages thereof, reference now is made to the following descriptions taken in connection with the accompanying drawings.

DETAILED DESCRIPTION OF PREFERRED EMBODIMENTS

Figure 1:
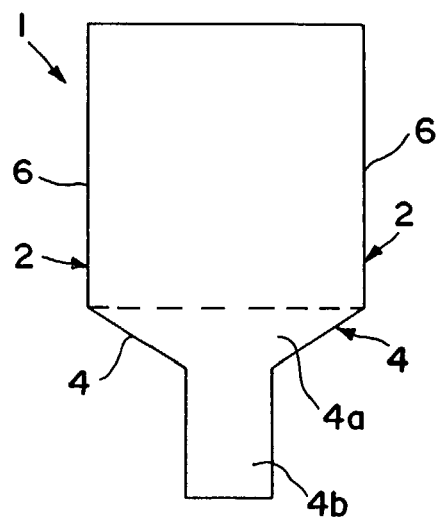
FIG. 1 is a front view of a known fryer vat.
Figure 2:
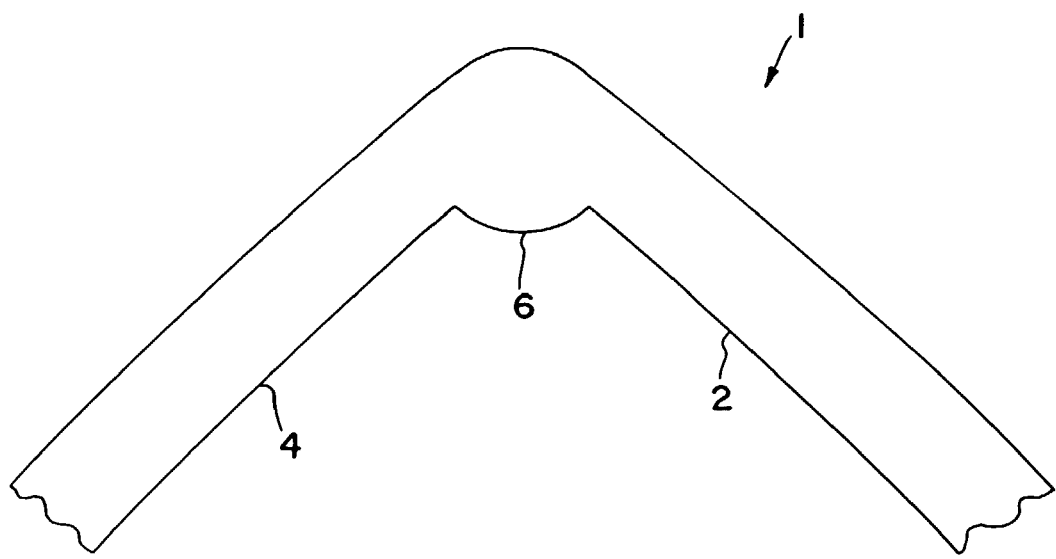
FIG. 2 is an exploded, cross-sectional view of a vertical vat weld of the fryer vat of FIG. 1.
Figure 3:
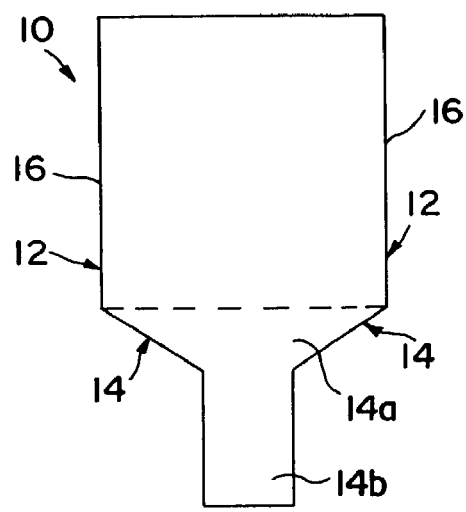
FIG. 3 is a front view of a fryer vat according to an embodiment of the present invention.
Figure 4:
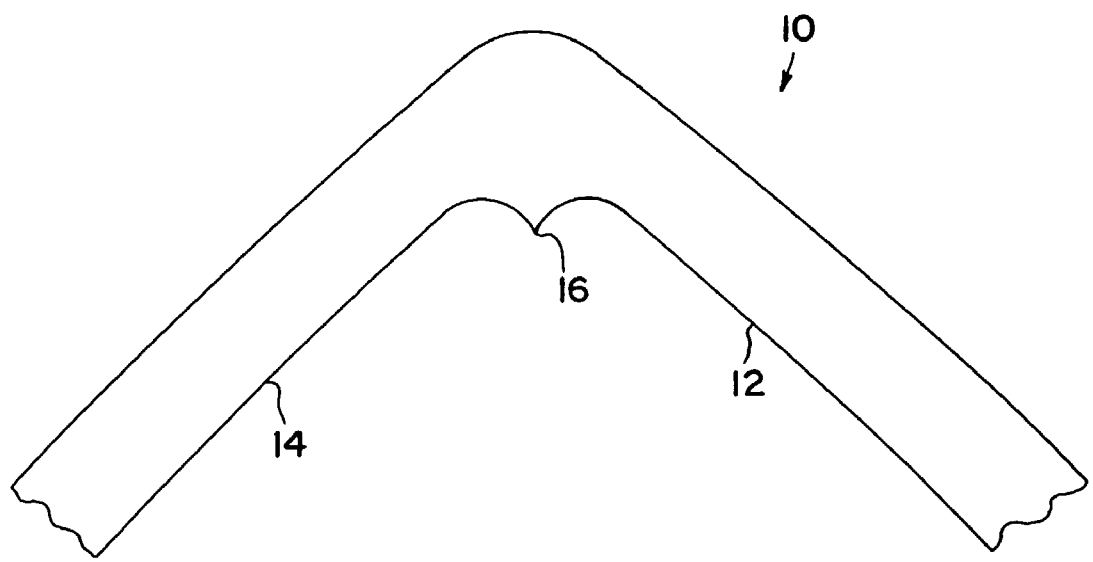
FIG. 4 is an exploded, cross-sectional view of a vertical vat weld of the fryer vat of FIG. 3.

Preferred embodiments of the present invention and their advantages may be understood by referring to FIGS. 3 and 4, like numerals being used for like corresponding parts in the various drawings.

Referring to FIGS. 3 and 4, a fryer vat 10 according to an embodiment of the present invention is described. Fryer vat 10 may comprise a main portion 14 and side portions 12 mounted on main portion 14. Side portions 12 may be substantially rectangular in shape. Main portion 14 may comprise a U-shaped portion 14a connected to side portions 12 and a cold zone 14b extending below U-shaped portion 14a. Cold zone 14b may comprise a drain formed at the bottom of cold zone 14b for catching any debris, e.g., crumbs, which may fall off of a food product during cooking. During manufacture, side portions 12 may be fixed to main portion 14 by a known welding process. For example, a filler material, e.g., a known solder, such as a stainless steel-based solder, or the like, may be positioned adjacent to or in contact with those portions of side portions 12 contacting main portion 14. The filler material subsequently may be melted using a known torch, such that when the filler material cools to a temperature sufficient to form a solid material, the filler material welds side portions 12 to main portion 14. Nevertheless, it will be understood by those of ordinary skill in the art that the filler material preferably may be a non-toxic material capable of being melted, and subsequently cooled, such that the filler material affixes side portions 12 to main portion 14.

When side portions 12 are welded to main portion 14, a vertical vat weld 16 may be formed at or adjacent to those lines at which U-shaped portion 14a intersects any two vertical ends or edges of side portions 12. For example, a first vertical vat weld 16 may be formed at or adjacent to a line at which U-shaped portion 4a intersects the front, left side portions 12. Similarly, a second vertical vat weld 16 may be formed at or adjacent to a line at which U-shaped portion 14a intersects the front, right side portions 12. Moreover, a third vertical vat weld 16 may be formed at or adjacent to a line at which U-shaped portion 14a intersects the rear, left side portions 12. Similarly, a fourth vertical vat weld 16 may be formed at or adjacent to a line at which U-shaped portion 14a intersects the rear, right side portions 12. When side portions 12 are welded to main portion 4, a horizontal vat weld (not shown) also may be formed at or adjacent to those lines at which U-shaped portion 14a contacts lower ends or edges of side portions 12.

Referring to FIG. 4, subsequent to the welding of side portions 12 to main portion 14, i.e., subsequent to the formation of vertical vat welds 16, a surface layer of at least one vertical vat weld 16 may be remelted. Specifically, the surface layer has a thickness less than a thickness of vat weld 16. As such, at least a portion, e.g., the toes, of at least one vertical vat weld 16 may comprise a remelted, e.g. a twice melted, surface layer and a once melted layer formed under the remelted surface layer. In one embodiment, each of the plurality of vertical vat welds 16 may comprise the remelted surface layer and the once melted layer formed under the remelted surface layer.

For example, the filler material may be positioned adjacent to or in contact with those portions of side portions 12 contacting main portion 14. The filler material subsequently may be melted using a torch, such that when the filler material cools to a temperature sufficient to form a solid material, the filler material welds side portions 12 to main portion 14 and forms the plurality of vertical vat welds 16. Moreover, subsequent to the formation of vertical vat welds 16, the torch may be reapplied to at least a portion, e.g., the toes, of at least one, e.g., each, vertical vat weld 16 for a period of time sufficient to remelt only the surface layer of vertical vat weld 16. For example, the torch may be an electric torch of about 50 amps (±25 amps), and may be applied from a first end of vertical vat weld 16, e.g., a lower end, to a second end of vertical vat weld 16, e.g., an upper end. Nevertheless, the specific characteristics of the torch used in forming vat weld 16 may depend on the type of torch used, and the skill of the person using the torch. Moreover, it will be understood by those of ordinary skill in the art that the period of time sufficient to remelt only the surface layer of vat weld 16 depends on the temperature at which the portion of that vertical vat weld 16 is remelted and the desired thickness of the remelted surface layer. It also will be understood by those of ordinary skill in the art that at least one, e.g., each, of the horizontal vat welds may be remelted in the same manner as vertical vat welds 16.

Moreover, in one embodiment, when the surface layer of each vat weld 16 is remelted, the torch may be applied to an area surrounding vat welds 16 and commencing from a point diagonally offset from and about ¾ inch (1.905 cm) beyond the first end of vat welds 16 and terminating at a point diagonally offset from and about ¾ inch (1.905 cm) beyond the second end of vat welds 16. In addition, after remelting, vat weld 16 may be cleaned to change a color of vat weld 16.

While the invention has been described in connection with preferred embodiments, it will be understood by those skilled in the art that other variations and modifications of the preferred embodiments described above may be made without departing from the scope of the invention. Other embodiments will be apparent to those skilled in the art from a consideration of the specification or practice of the invention disclosed herein. It is intended that the specification and the described examples are considered as exemplary of the invention indicated by the flowing claims.

What is claimed is:

1. A fryer vat having strengthened vat welds comprising:
a plurality of side portions;
a main portion welded to the side portions; and
a plurality of vertical vat welds formed at or adjacent to any two vertical ends or edges of said side portions by applying a torch to a filler material, wherein at least one of said vertical vat welds comprises a remelted surface layer formed by reapplying said torch over at least a portion of said at least one vat weld subsequent to the formation of said at least one vertical vat weld, wherein said remelted surface layer comprises a first concave portion having a first substantially uniform radius and a second concave portion having a second substantially uniform radius, wherein an edge of said first concave portion abuts an edge of said second concave portion, such that said edges define a ridge therebetween, and said first substantially uniform radius is substantially equal to said second substantially uniform radius.

2. The fryer vat of claim 1, wherein said at least one vertical vat welds comprises a pair of weld toes extending to either side of said at least one vertical vat weld.

3. The fryer vat of claim 1, wherein said torch is reapplied to said at least one vertical vat weld from a first end of said vertical vat weld to a second end of said vertical vat weld.

4. The fryer vat of claim 3, wherein said torch is reapplied to an area surrounding said at least one vertical vat weld and commencing from a point diagonally offset from and about ¾ inch (1.905 cm) beyond said first end of said at least one vertical vat weld and terminating at a point diagonally offset from and about ¾ inch (1.905 cm) beyond said second end of said at least one vertical vat weld.

5. The fryer vat of claim 1, wherein said torch is an electric torch of about 50 amps (±25 amps).

6. The fryer vat of claim 3, wherein said first end is a lower end of said vat weld and said second end is an upper end of said vat weld.

* * * * *